United States Patent
Miyasato et al.

(10) Patent No.: US 7,433,577 B2
(45) Date of Patent: Oct. 7, 2008

(54) METHOD AND APPARATUS FOR REPRODUCING TELEVISION BROADCAST PROGRAM DIGEST

(75) Inventors: Hajime Miyasato, Tsurugashima (JP); Takeshi Nakamura, Tsurugashima (JP); Michikazu Hashimoto, Tsurugashima (JP); Toshio Tabata, Tsurugashima (JP)

(73) Assignee: Pioneer Corporation, Tokyo (JP)

( * ) Notice: Subject to any disclaimer, the term of this patent is extended or adjusted under 35 U.S.C. 154(b) by 981 days.

(21) Appl. No.: 10/247,680

(22) Filed: Sep. 20, 2002

(65) Prior Publication Data

US 2003/0072558 A1  Apr. 17, 2003

(30) Foreign Application Priority Data

Oct. 12, 2001  (JP)  ............................. 2001-315330

(51) Int. Cl.
| H04N 9/79 | (2006.01) |
| H04N 5/91 | (2006.01) |
| H04N 5/93 | (2006.01) |
| H04N 7/26 | (2006.01) |
| H04N 7/16 | (2006.01) |
| H04N 7/173 | (2006.01) |
| H04B 7/00 | (2006.01) |

(52) U.S. Cl. ............................. 386/83; 386/45; 386/46; 386/52; 386/68; 386/69; 386/81; 386/95; 386/98; 386/112; 386/124; 455/45; 725/28; 725/29; 725/88; 725/91; 725/92; 725/93

(58) Field of Classification Search .................. 386/45, 386/46, 52, 68, 69, 81, 83, 95, 98, 112, 124; 455/45; 725/28, 29, 34, 87, 88, 91, 92, 93
See application file for complete search history.

(56) References Cited

U.S. PATENT DOCUMENTS

| 5,410,344 A | * | 4/1995 | Graves et al. ................. 725/46 |
| 5,974,218 A | * | 10/1999 | Nagasaka et al. ............. 386/46 |
| 6,160,950 A | * | 12/2000 | Shimazaki et al. ............ 386/46 |
| 6,311,011 B1 | * | 10/2001 | Kuroda ........................ 386/46 |

(Continued)

FOREIGN PATENT DOCUMENTS

EP  0 597 450  5/1994

(Continued)

*Primary Examiner*—Thai Tran
*Assistant Examiner*—Syed Y Hasan
(74) *Attorney, Agent, or Firm*—Drinker Biddle & Reath LLP (57) ABSTRACT

An apparatus for reproducing a television broadcast program digest which stores a broadcast signal indicative of contents of at least one television broadcast program and guide data of the at least one television broadcast program. The apparatus pre-stores a period of time and a weight point as data for at least one attribute concerning program contents every different television broadcast program. The apparatus reads the broadcast signal and guide data of the at least one television broadcast program when a digest reproduction is performed. In accordance with the guide data, the apparatus reads a period of time and a weight point for each attribute corresponding to a television broadcast program consistent in terms of content with or similar to the at least one television broadcast program. The apparatus reproduces a partial signal having a length of time based on the weight point and the period of time.

7 Claims, 5 Drawing Sheets

U.S. PATENT DOCUMENTS 6,964,061 B2 * 11/2005 Cragun et al. .................. 725/93
2001/0051516 A1 * 12/2001 Nakamura et al. .......... 455/412

FOREIGN PATENT DOCUMENTS

| EP | 0 915 471 | | 5/1999 |
| EP | 0 929 197 | A2 | 7/1999 |
| EP | 0939 405 | A2 | 9/1999 |
| EP | 1 079 623 | A1 | 2/2001 |
| JP | 10-32776 | | 2/1998 |
| JP | 11-205704 | | 7/1999 |
| JP | 11-238071 | | 8/1999 |
| WO | WO 00/45388 | | 8/2000 |

* cited by examiner

| | | | |
|---|---|---|---|
| 1 | NEWS | 10 MINUTES | ……… |
| 2 | NEWS | 30 MINUTES | ……… |
| 3 | DRAMA | 30 MINUTES | ……… |
| 4 | DRAMA | 15 MINUTES | ……… |
| 5 | SPORTS | 1 HOUR | ……… |
| …. | …. | …. | …. |

| CATEGORY | NEWS | | |
|---|---|---|---|
| BROADCAST PERIOD | 30 MINUTES | | |
| TITLE | AA NEWS | | |
| ……… | ……… | | |
| STARTING TIME | ENDING TIME | ATTRIBUTE | WEIGHT POINT |
| 0 SECOND | 2 MINUTES 30 SECONDS | POLITICS & ECONOMY | 90 |
| 20 MINUTES | 23 MINUTES | SPORTS | 60 |
| 23 MINUTES | 25 MINUTES | WEATHER FORECAST | 70 |
| 29 MINUTES | 29 MINUTES 59 SECONDS | ENDING | 5 |

| CATEGORY | NEWS | | |
|---|---|---|---|
| BROADCAST PERIOD | 30 MINUTES | | |
| TITLE | AA NEWS | | |
| ...... | ...... | | |
| STARTING TIME | ENDING TIME | ATTRIBUTE | WEIGHT POINT |
| 0 SECOND | 2 MINUTES 30 SECONDS | POLITICS & ECONOMY | 90 |
| 20 MINUTES | 23 MINUTES | SPORTS | (60) P |
| 23 MINUTES | 25 MINUTES | WEATHER FORECAST | 70 |
| 29 MINUTES | 29 MINUTES 59 SECONDS | ENDING | 5 |
| | | | |

FIG. 5B

| CATEGORY | NEWS | | |
|---|---|---|---|
| BROADCAST PERIOD | 30 MINUTES | | |
| TITLE | AA NEWS | | |
| ...... | ...... | | |
| STARTING TIME | ENDING TIME | ATTRIBUTE | WEIGHT POINT |
| 0 SECOND | 2 MINUTES 30 SECONDS | POLITICS & ECONOMY | 90 |
| 20 MINUTES | 23 MINUTES | SPORTS | (30) |
| 23 MINUTES | 25 MINUTES | WEATHER FORECAST | 70 |
| 29 MINUTES | 29 MINUTES 59 SECONDS | ENDING | 5 |
| | | | |

METHOD AND APPARATUS FOR REPRODUCING TELEVISION BROADCAST PROGRAM DIGEST

BACKGROUND OF THE INVENTION

1. Field of the Invention

The present invention relates to a digest reproduction method and apparatus for summarily reproducing a television broadcast program.

2. Description of the Related Background Art

It is known that there is a digest reproduction method for partially playing a storage medium, on which television broadcast programs were recorded, to understand the entire contents of the programs in a short time without playing back all the recorded areas of the storage medium.

However, in a conventional digest reproduction method, parts to be played back from the recorded areas of the storage medium are selected, for example, in accordance with variations in level of an image signal or an audio signal, and then the selected parts are extracted to output them as a reproduced signal. Accordingly, there is a problem in that it is difficult to reproduce an image corresponding to an appropriate digest of the contents of a television broadcast program in the conventional digest reproduction method.

SUMMARY OF THE INVENTION

It is therefore an object of the present invention to provide a digest reproduction apparatus and method that can appropriately digest the contents of a television broadcast program and reproduce the digest of the program.

According to the present invention, there is provided a reproduction apparatus for reproducing a television broadcast program digest, comprising: a first storage device which stores a broadcast signal indicative of contents of at least one television broadcast program and guide data of the at least one television broadcast program, a second storage device which previously stores as data a period of time and a weight point for at least one attribute concerning program contents every different television broadcast program, a reading device, when a digest reproduction is performed, which reads the broadcast signal and the guide data of the at least one television broadcast program from the first storage device, and in accordance with the read guide data, reads from the second storage device a time period and a weight point for each attribute corresponding to a television broadcast program which is equal to or similar to the at least one television broadcast program in contents, and a reproduction device which reproduces a partial signal of the broadcast signal read from the first storage device, the partial signal having a length of time based on the corresponding the weight point in the time period for each attribute read from the second storage device.

According to the present invention, there is provided a reproduction method for reproducing a television broadcast program digest, comprising the steps of: storing a broadcast signal indicative of contents of at least one television broadcast program and guide data of the at least one television broadcast program in a first storage device, previously storing as data a period of time and a weight point for at least one attribute concerning program contents every different television broadcast program in a second storage device, when a digest reproduction is performed, reading the broadcast signal and the guide data of the at least one television broadcast program from the first storage device, and in accordance with the read guide data, reading from the second storage device a time period and a weight point for each attribute corresponding to a television broadcast program which is equal to or similar to the at least one television broadcast program in contents, and reproducing a partial signal of the broadcast signal read from the first storage device, the partial signal having a length of time based on the corresponding weight point in the time period for each attribute read from the second storage device.

DETAILED DESCRIPTION OF THE PREFERRED EMBODIMENT

The embodiment of the present invention will be described in detail with reference to the accompanying drawings.

Figure 1:
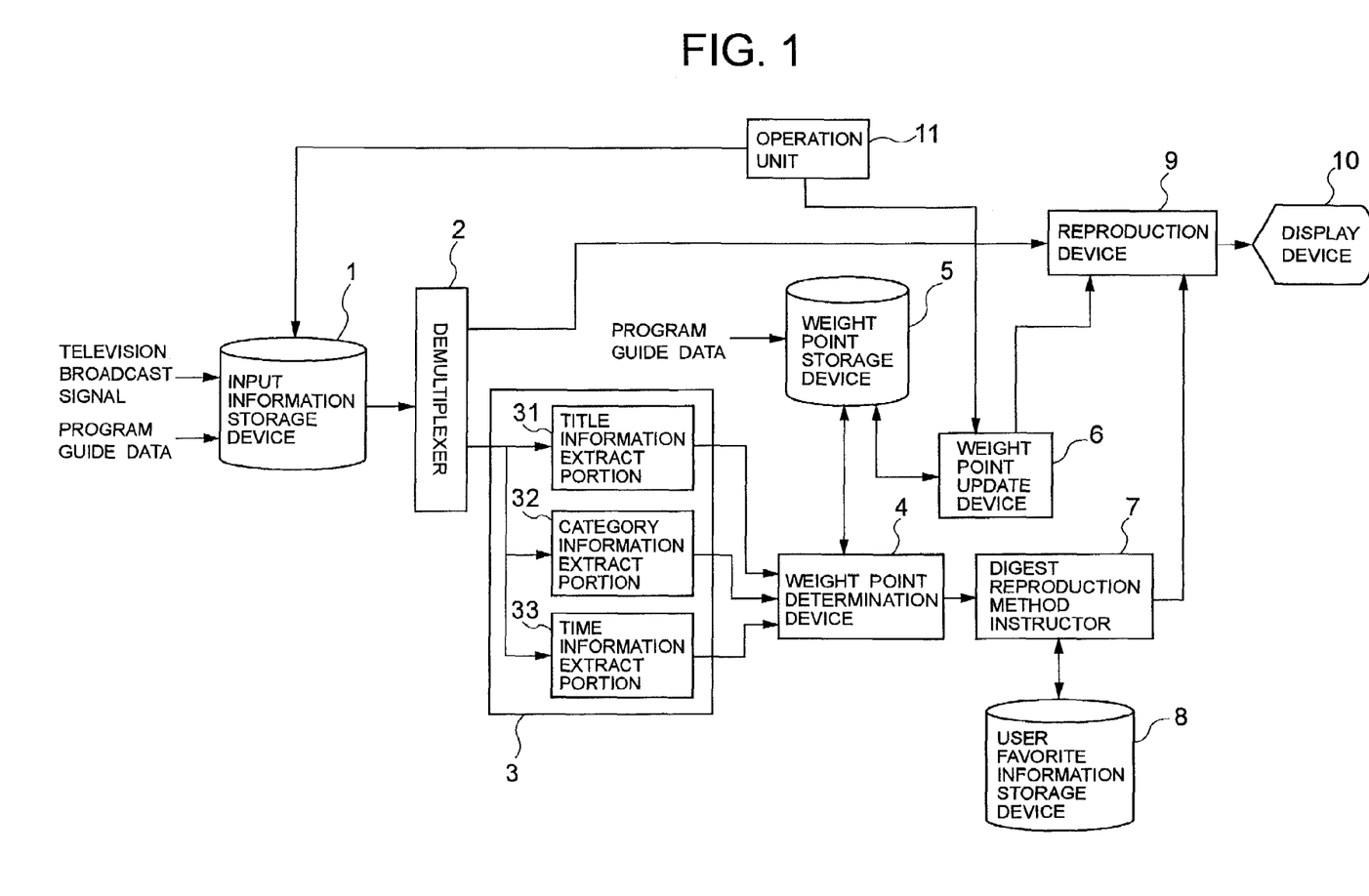
FIG. 1 is a block diagram illustrating an embodiment according to the present invention.

FIG. 1 illustrates an apparatus for reproducing a television broadcast program digest according to the present invention. The television broadcast program digest reproducing apparatus includes an input information storage device 1, a demultiplexer 2, a program guide information extractor 3, a weight point determination device 4, a weight point storage device 5, a weight point updating device 6, a digest reproduction method instructor 7, a user favorite information storage device 8, a reproduction device 9, a display device 10, and an operation unit 11.

The input information storage device 1 includes a broadcast receiver and a hard disk, for example, receives a television broadcast signal and stores the contents of the signal (broadcast signal indicative of audio-visual information) as program content data for each program as it is. The input information storage device 1 also stores program guide data such as an electronic program guide (EPG) in the television broadcast signal, corresponding to the program content data for each program. The program content data includes video and audio data. For each program, the program guide data includes the title of a program, a category, starting and ending times, a brief description of the program content, and keywords for the program content (e.g., performers, the author, the director, the name of series, names of music or areas). The program guide data may be derived through the Internet from a WWW (world wild web) server that transmits the program guide information. The input information storage device 1 reads and outputs the program content data and program guide data corresponding to a program specified by an input operation on the operation unit 11.

The demultiplexer 2 separates the program content data and the program guide data read from the input information storage device 1, from each other for output. The program content data is supplied to the reproduction device 9, while the program guide data is supplied to the program guide information extractor 3.

The program guide information extractor 3 extracts predetermined guide items such as title information, category information or time information from the program guide data for individual output. For example, the program guide information extractor 3 includes a title information extract portion 31, a category information extract portion 32, and a time information extract portion 33.

Each output of the program guide information extractor 3 is coupled to the weight point determination device 4. The weight point determination device 4 searches data stored in the weight point storage device 5 to set a weight template indicative of weight points in accordance with the guide items extracted by the program guide information extractor 3 and then supplies the resulting weight template to the digest reproduction method instructor 7. The weight template, as used herein, specifies the assignment of a segmented period of time to a program for digest reproduction. For example, the data stored in the weight point storage device 5 includes a weight template corresponding to a particular program, a weight template corresponding to each category, or a weight template corresponding to performers. The particular program is a well-known program for which a weight template has been pre-set or the weight template of which the user has updated through the operation described later. The weight template corresponding to each category is a predetermined template based on the category and time of the program. For example, since there are 15-minute programs, 30-minute programs or one-hour programs for news and drama categories, different periods of time are assigned depending on the category and time of programs. The data stored in the weight point storage device 5 is supplied in conjunction with the program guide data in a television broadcast signal or as data over the Internet.

Figure 2:
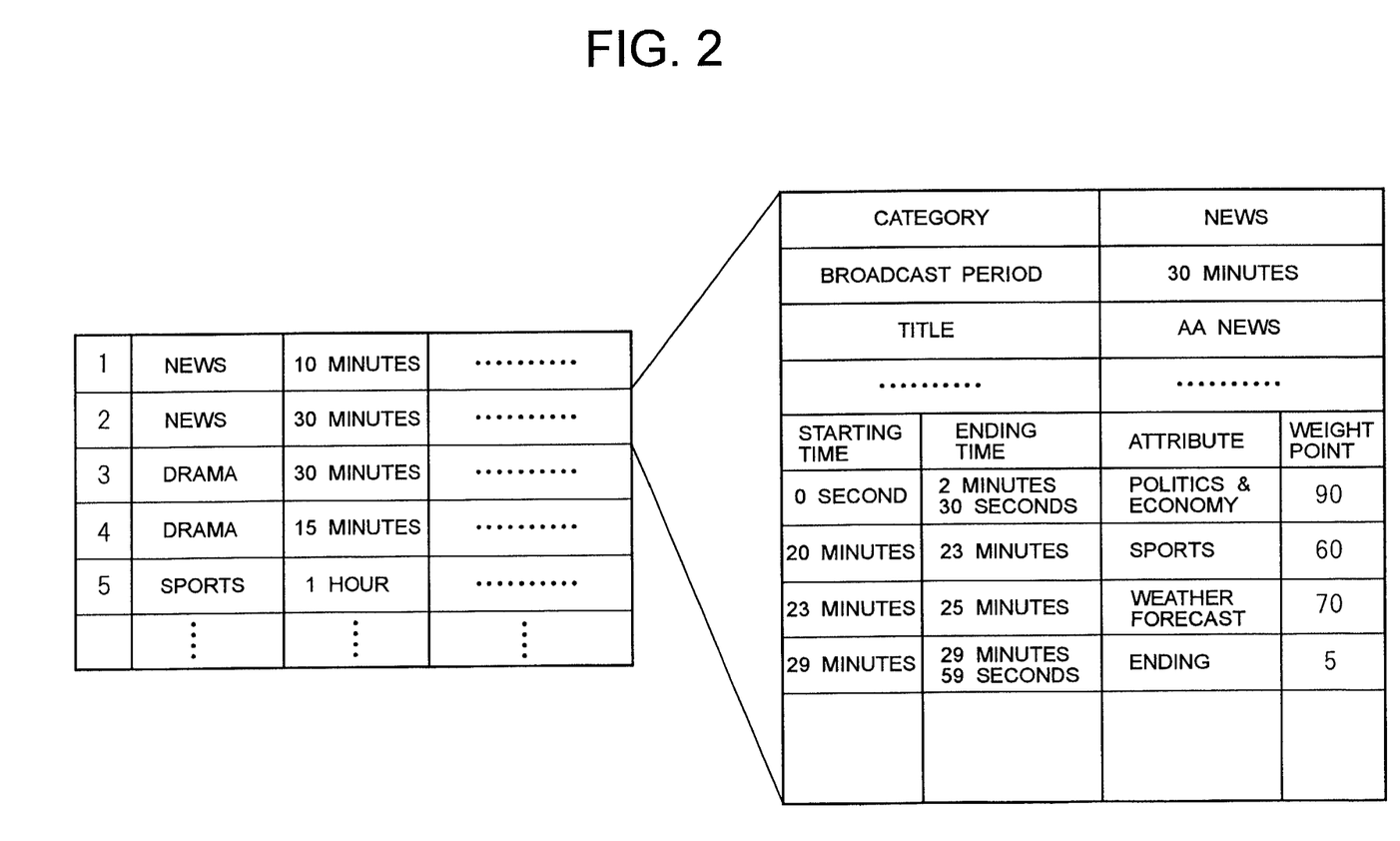
FIG. 2 shows the contents of a weight template.

FIG. 2 illustrates an example of category specified data stored in the weight point storage device 5, particularly, data of a 30-minutes news program. The contents of the data include the category, broadcast times (periods of time), title (name of an exemplary 30-minute news program), attributes, and starting times, ending times, and weight points for each of the attributes. For the news category, the attributes show types of news such as news on politics & economy, sports, or weather forecasts and a characteristic portion like an ending. For the drama category, the introduction, development, turn, and conclusion of a drama are taken as attributes. For other categories, attributes are specified according to such items as types, characteristics, or properties that can be categorized in a program for the assignment of segmented periods of time. The weight point is set to each attribute in 0 to 100. In the example shown in FIG. 2, the politics & economy, sports, weather forecasts, and endings are provided with weight points of 90, 60, 70, and 5, respectively.

The weight point update device 6 allows the user at the operation unit 11 to operatively modify weight points of each template stored in the weight point storage device 5. Upon this modification, the display device 10 displays a weight point for each attribute of the specified template, and the weight point update device 6 allows the user to change a value of a weight point into the desired one through cursor operation or by entering numerals at the operation unit 11.

The digest reproduction method instructor 7 instructs a digest reproduction method to the reproduction device 9 in accordance with a weight template supplied from the weight point determination device 4. The digest reproduction method is primarily determined in accordance with a weight point for each attribute. For example, suppose that in digest reproduction, program content data is extracted only from its starting time until passing a predetermined time t (a reference period for digest reproduction) for each attribute and the resulting data is assembled to generate digest data. In this case, the predetermined time t is weighted in accordance with a weight point A of each attribute that can be known from the weight template. For example, a weighted reproduction time t' can be expressed by $t \times A \times C/50$, where C is a favorite correction value based on favorite information and has an initial value of one. When the favorite correction value C equals to one, no weighting takes place at the weight point A equal to 50, the weighted time t' is greater than t at the weight point A greater than 50, and the weighted time t' is less than t at the weight point A less than 50. Therefore, the digest reproduction method instruction is indicative of at least the attribute of the specified program and the starting time and reproduction time t' of the attribute. The predetermined time t may be the number of frames or different for each attribute.

When a weight point B is set for each image frame of the program content data, the weight point B may be weighted by $A \times C/50$ to employ frames having a corrected weight point $B \times A \times C/50$ greater than or equal to a threshold for digest reproduction.

The favorite correction value C is defined for each attribute in accordance with the users' favorite information that is pre-stored in the user favorite information storage device 8. The user's favorite information may be objects of user's hobby or interest. For example, if the user's hobby is sports, the favorite correction value C is set to 1.2 to provide news of the sports attribute with a longer period of time for digest reproduction. For example, for the drama category, such favorite information may also be acceptable that no reproduction is required for the ending part of the attribute, in the case of which C is set to 0.

The user favorite information storage device 8 may store the user's favorite information as the value of a favorite correction value C for each attribute.

A digest reproduction method instruction is supplied from the digest reproduction method instructor 7 to the reproduction device 9. The reproduction device 9 extracts data of a reproduction portion from program content data supplied from the demultiplexer 2 and demodulates the extracted data into reproduced data for output in accordance with the digest reproduction method instruction. The demodulated output includes image and audio signals, which are supplied to the display device 10. The display device 10 may be, for example, a television receiver, which displays image information according to the image signal supplied from the reproduction device 9 as well as audio information according to the audio signal.

Figure 3:
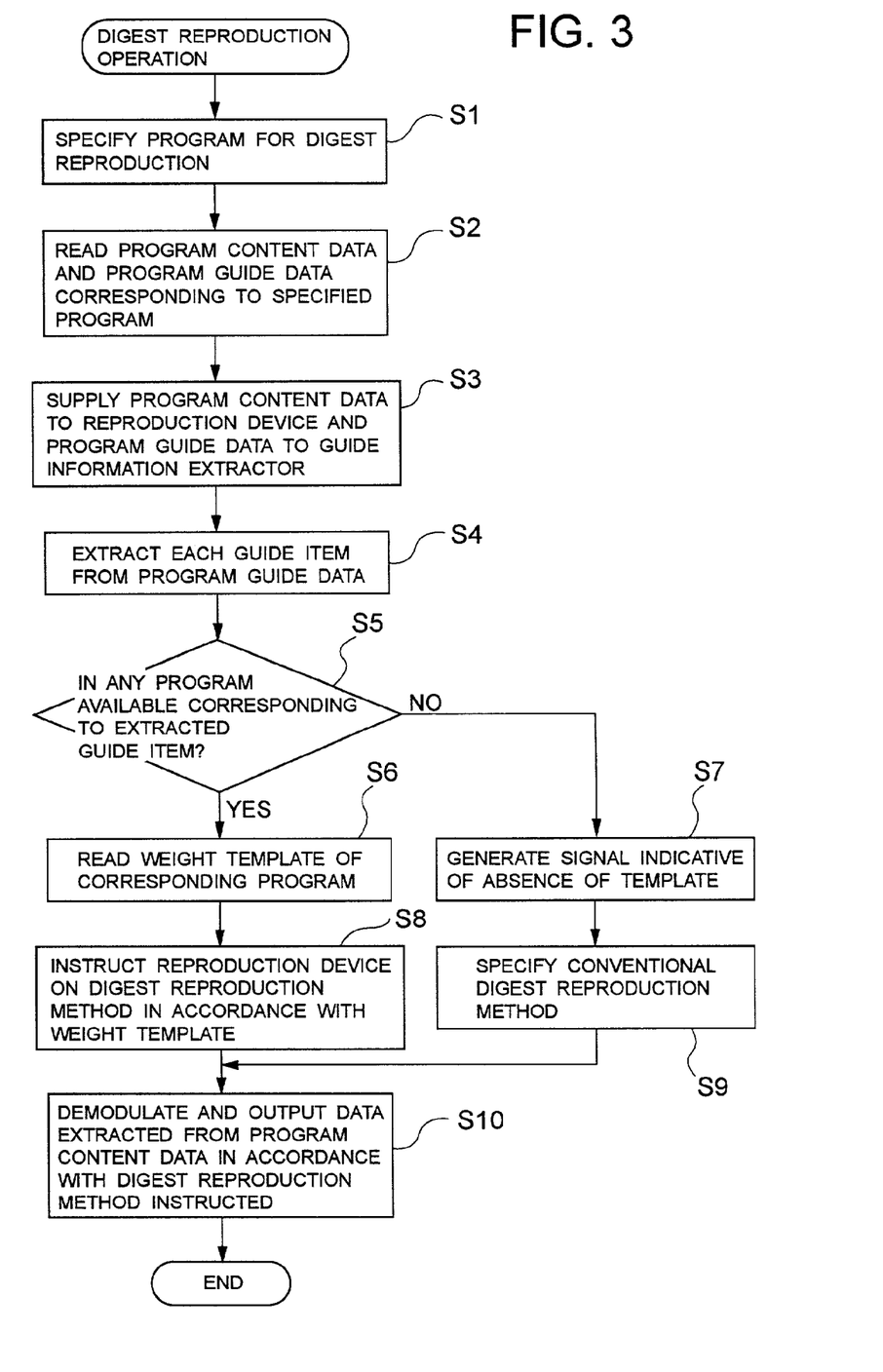
FIG. 3 is a flowchart showing an operation of a digest reproduction.

In the television broadcast program digest reproduction apparatus having such a configuration, a digest reproduction operation is carried out in the order shown in FIG. 3. That is, the user specifies a program for digest reproduction at the operation unit 11 and then the program is recognized in the apparatus (step S1). The apparatus allows the program content data and program guide data on the specified program to be read out from the input information storage device 1 and supplied to the demultiplexer 2 (step S2). The demultiplexer 2 then supplies the program content data to the reproduction device 9 while supplying the program guide data to the program guide information extractor 3 (step S3). The program guide information extractor 3 extracts guide items such as the title, the category, or the starting and ending times from the program guide data to supply the resulting items to the weight point determination device 4 (step S4). The weight point determination device 4 determines whether the weight template corresponding to the extracted guide items is available in the weight point storage device 5 (step S5). If the weight template corresponding to the guide items is available in the weight point storage device 5, the corresponding weight template is read out (step S6). When the weight template corresponding to the specified program represented by the guide items is available in the weight point storage device 5, the corresponding weight template is read out as stored. In the case where a weight template corresponding to the specified program is not available in the weight point storage device 5 but a weight template corresponding to the category is available in the weight point storage device 5, the weight template corresponding to the category is read out. The weight template thus read out is supplied to the digest reproduction method instructor 7. When a corresponding weight template is not present in the weight point storage device 5, a signal indicative of the absence of the templates is supplied to the digest reproduction method instructor 7 (step S7).

When a weight template is supplied to the digest reproduction method instructor 7, the digest reproduction method instructor 7 sets a digest reproduction method as described above in accordance with the weight template and instructs the reproduction device 9 on the method (step S8). On the other hand, when the signal indicative of the absence of templates is supplied, the digest reproduction method instructor 7 sets a conventional digest reproduction method to instruct the reproduction device 9 on the method (step S9). The digest reproduction method at step S9 may employ the one disclosed in a Japanese Patent Laid-Open Publication No.Hei 10-32776.

The reproduction device 9 extracts data of a reproduction portion in accordance with the digest reproduction method provided by the program content data to demodulate the extracted data into reproduced data for output (step S10).

As described above, since a longer period of reproduction time is set as a program has a higher weight point by the aforementioned digest reproduction operation, it is possible to provide digest reproduction having appropriately assigned time periods.

Figure 4:
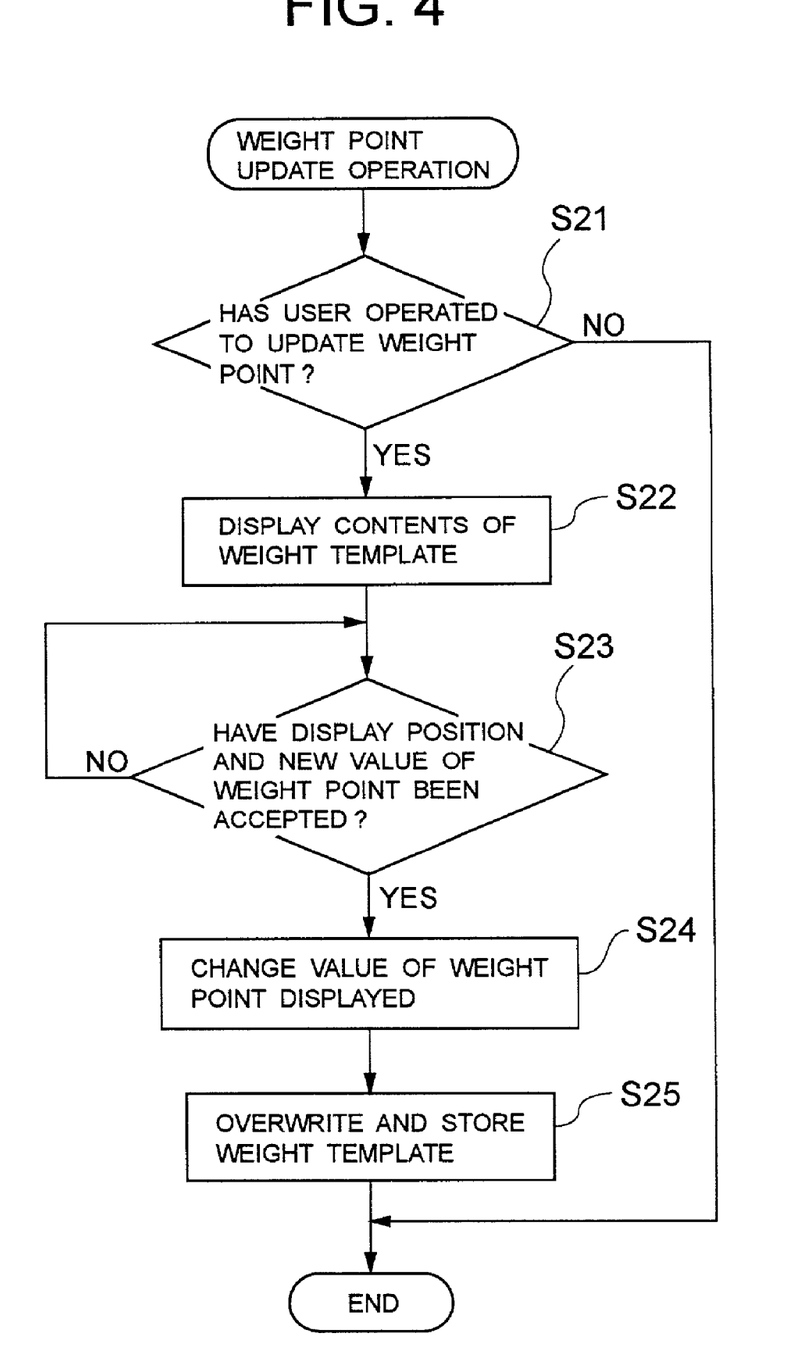
FIG. 4 is a flowchart showing an operation for updating a weight point.
Figure 5A:
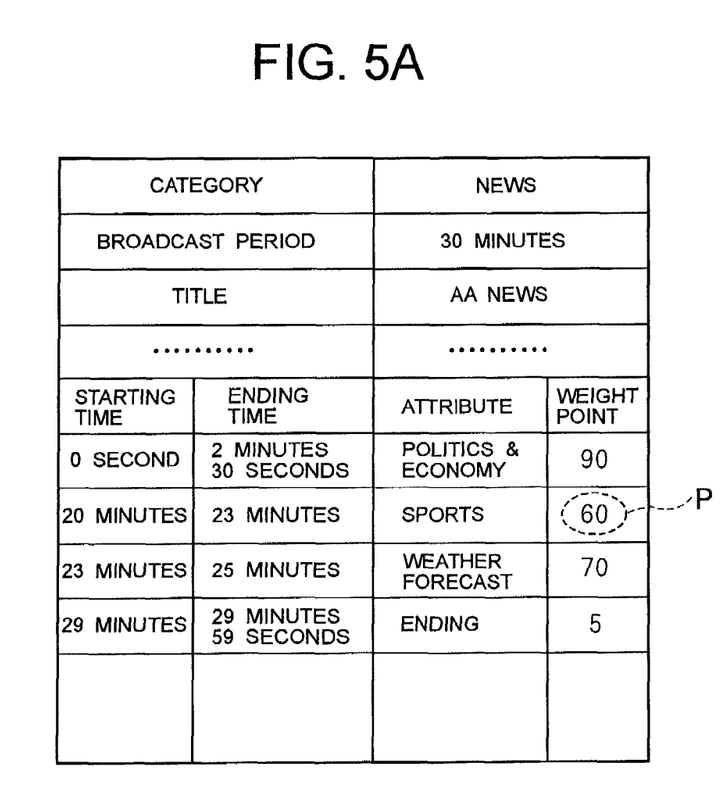
FIGS. 5A and 5B each show a display for changing a weight point.

As shown in FIG. 4, the weight point update device 6 carries out an update operation for weight points at the operation unit 11. In the update operation, the process for the update operation first determines whether an input operation for updating a weight point has been executed at the operation unit 11 by the user (step S21). If the input operation has been executed, the display device 10 displays the contents of a weight template, as shown in FIG. 5A (step S22). The weight template, the contents of which are displayed in the figure, corresponds to the specified program. Upon displaying the contents of the weight template, display data is prepared in accordance with the weight template read out from the weight point storage device 5 and then is supplied to the reproduction device 9. The reproduction device 9 supplies an image signal corresponding to the display data to the display device 10, thereby allowing the contents of the weight template to be displayed on the display device 10.

Figure 5B:
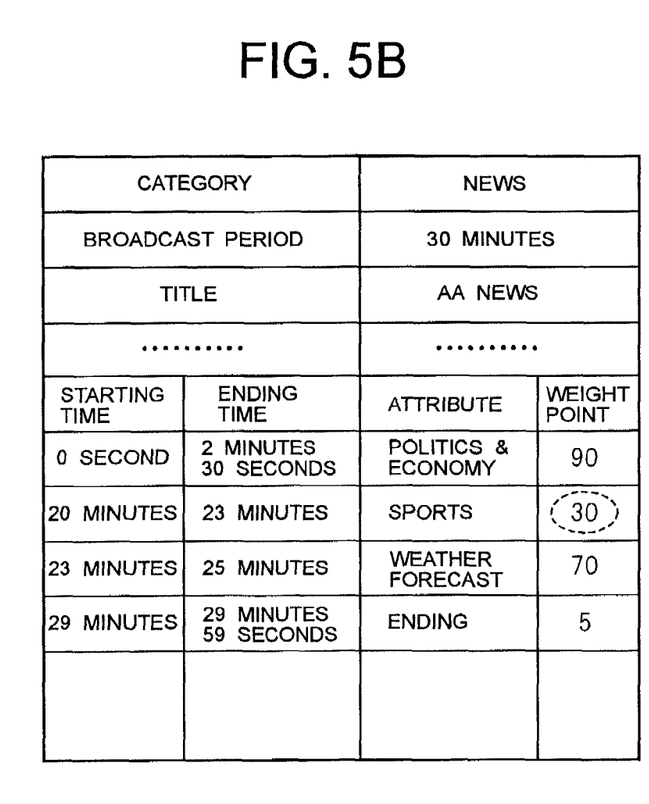

The process then determines whether the weight point update device 6 has accepted the display position of a weight point indicated by a pointer (e.g., encircled by broken line P in FIG. 5A) and a new value of the weight point on the window of the display device 10 through the operation by the user at the operation unit 11 (step S23). If the value has been accepted, the process allows the weight point update device 6 to change the value of the weight point displayed at the weight point display position to the accepted new value, for example, as shown in FIG. 5B (step S24). The weight point update device 6 updates the weight template by changing the weight point of the attribute corresponding to the weight point display position to the accepted new value, and then allows to overwrite the weight template onto the weight point storage device 5 to store therein (step S25). Accordingly, the user can change as desired the weight point of each attribute of the weight template corresponding to the specified program, thereby making it possible to provide digest reproduction as the user desires.

The weight point of only one attribute is changed in the aforementioned embodiment; however, the weight point of each attribute may also be changed. In this case, the process repeats steps S23 to S24 until the user operatively inputs a change termination instruction at the operation unit 11, and when the change termination instruction is issued, the process performs step S26.

As described above, the present invention makes it possible to appropriately digest the contents of a television broadcast program and reproduce the digest of the program.

This application is based on a Japanese Patent Application No. 2001-315330 which is hereby incorporated by reference.

What is claimed is:

1. A reproduction apparatus for reproducing a television broadcast program digest, comprising:
   a first storage device which stores a broadcast signal indicative of audio and video signals of at least one television broadcast program and guide data of the at least one television broadcast program;
   a second storage device which previously stores as data a broadcast period of time and a weight point for at least one attribute every different television broadcast program, the attribute representing a program part distinguishable in terms of contents in one television broadcast program, and the weight point being a value indicative of user's preference concerning each attribute;
   a reading device, when a digest reproduction is performed, which reads the broadcast signal and the guide data of the at least one television broadcast program from said first storage device, and in accordance with the read guide data, reads from said second storage device a broadcast period of time and a weight point for each attribute of a television broadcast program which is equal to or similar to the at least one television broadcast program in contents; and
   a reproduction device which reproduces a partial signal of the broadcast signal read from said first storage device, the partial signal having a length of time corresponding to the weight point in the broadcast period for each attribute read from said second storage device.

2. A reproduction apparatus according to claim 1, wherein the guide data of the at least one television broadcast program is indicative of at least a title name, a category, and a total broadcast time of the television broadcast program.

3. A reproduction apparatus according to claim 1, wherein said second storage device stores a template indicative of the broadcast period and the weight point for each attribute concerning program contents every different reference television broadcast program, and said reading device reads a template which is equal to or similar to the at least one television broadcast program from said second storage device, in accordance with the guide data.

4. A reproduction apparatus according to claim 1, further comprising:
   a third storage device in which user favorite data is stored, and
   a correction device which corrects the weight point read from said second storage device in accordance with the user favorite data and for supplying the corrected weight point to said reproduction device.

5. A reproduction apparatus according to claim 1, further comprising:

a device which corrects a weight point for each attribute of the television broadcast program which is equal to or similar to the at least one television broadcast program in contents, stored in said second storage device, in accordance with an input operation and overwrites the stored data of said second storage device with the corrected weight point.

6. A reproduction apparatus according to claim 1, wherein a digest reproduction reference period is previously set for each attribute of the television broadcast program which is equal to or similar to the at least one television broadcast program in contents, and said reproduction device correctively weights the digest reproduction reference period in accordance with a corresponding weight point in the broadcast period for each attribute read from said second storage device to thereby set said length of time.

7. A method for reproducing a television broadcast program digest, comprising the steps of:

storing a broadcast signal indicative of audio and video signals of at least one television broadcast program and guide data of the at least one television broadcast program in a first storage device;

previously storing as data a broadcast period of time and a weight point for at least one attribute every different television broadcast program in a second storage device, the attribute representing a program part distinguishable in terms of contents in one television broadcast program, and the weight point being a value indicative of user's preference concerning each attribute;

when a digest reproduction is performed, reading the broadcast signal and the guide data of the at least one television broadcast program from said first storage device, and in accordance with the read guide data, reading from said second storage device a broadcast period of time and a weight point for each attribute of a television broadcast program which is equal to or similar to the at least one television broadcast program in contents; and reproducing a partial signal of the broadcast signal read from said first storage device, the partial signal having a length of time corresponding to the weight point in the broadcast period for each attribute read from said second storage device.

* * * * *